US012610337B2

(12) United States Patent
Li et al.

(10) Patent No.: US 12,610,337 B2
(45) Date of Patent: Apr. 21, 2026

(54) TERMINAL ACCESS METHOD IN SHARED NETWORK, DEVICE, BASE STATION, AND STORAGE MEDIUM

(71) Applicant: ZTE CORPORATION, Shenzhen (CN)

(72) Inventors: Dapeng Li, Shenzhen (CN); Yin Gao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 347 days.

(21) Appl. No.: 18/574,768

(22) PCT Filed: Oct. 8, 2022

(86) PCT No.: PCT/CN2022/123770
§ 371 (c)(1),
(2) Date: Dec. 28, 2023

(87) PCT Pub. No.: WO2023/130783
PCT Pub. Date: Jul. 13, 2023

(65) Prior Publication Data
US 2024/0323887 A1 Sep. 26, 2024

(30) Foreign Application Priority Data
Jan. 6, 2022 (CN) .......................... 202210009208.4

(51) Int. Cl.
*H04W 60/00* (2009.01)
*H04W 8/24* (2009.01)
(52) U.S. Cl.
CPC ............. *H04W 60/00* (2013.01); *H04W 8/24* (2013.01)
(58) Field of Classification Search
CPC ........... H04W 36/00226; H04W 48/18; H04W 60/00; H04W 60/04; H04W 8/24
See application file for complete search history.

(56) References Cited

U.S. PATENT DOCUMENTS

2006/0135157 A1* 6/2006 Baek ...................... H04W 8/02
455/433
2019/0098547 A1* 3/2019 Chong .............. H04W 36/1443
(Continued)

FOREIGN PATENT DOCUMENTS

WO WO 2020/190875 A1 9/2020

OTHER PUBLICATIONS

International Search Report in Application No. PCT/CN2022/123770 dated Dec. 22, 2022, 6 pages, including translation.
(Continued)

*Primary Examiner* — Timothy X Pham
(74) *Attorney, Agent, or Firm* — Morgan, Lewis & Bockius LLP

(57) ABSTRACT

Disclosed are a terminal access method in a shared network, a device, a base station and a storage medium. The terminal access method in the shared network includes that: a first network element acquires a registration request message of a second network element; the first network element sends a terminal radio capability request message to a third network element; the first network element receives terminal radio capability information of the second network element sent by the third network element; and the first network element sends a registration response message to the second network element when it is determined according to the terminal radio capability information of the second network element that the second network element does not support a voice service in a network to which the first network element belongs.

20 Claims, 5 Drawing Sheets

(56) References Cited

U.S. PATENT DOCUMENTS

| 2020/0100309 | A1 | 3/2020 | Jha et al. |
| 2020/0383010 | A1 | 12/2020 | Zhu et al. |
| 2025/0324357 | A1* | 10/2025 | Long ..................... H04W 60/00 |

OTHER PUBLICATIONS

Zte et al. "R3-220756. VoNR supportive for UE capability Check procedure in NGAP", 3GPP TSG-RAN WG3 #114bis-e, Jan. 7, 2022.
Intel. "S2-1902984, Correction of description of the IMS voice over PS Session Supported Indication", SA WG2 Meeting #S2-132, Apr. 12, 2019.
Qualcomm Inc. "R2-1814226, Remaining Issues in UE Radio Capability for IMS Voice" 3GPP TSG-RAN WG2 Meeting #103bis, Oct. 12, 2018.
Extended European Search Report in Application No. 22918237.3, dated Jul. 29, 2025, 9 pages.

Vivo Mobile Communication Co Ltd et al., "Enable a UE to indicate 5G SRVCC support when registering with EPS and 3G/4G Srvcc support when registering with 5GS", 3GPP Draft; S2-2000111, 3rd Generation Partnership Project (3GPP), Mobile Competence Centre ; 650, Route Des Lucioles ; F-06921 Sophia-Antipolis Cedex; France, vol. SA WG2, No. Incheon, Korea (Republic Of); Jan. 13, 2020-Jan. 17, 2020 Jan. 7, 2020 (Jan. 7, 2020), XP051842220, Retrieved from the Internet: https://www.3gpp.org/ftp/tsg_sa/WG2_Arch/TSGS2_136AH_Incheon/Docs/s2-2000111.zip.
Ericsson et al., "EPS Fallback for voice", 3GPP Draft; 23501_CR0055_5GS_PH1_(REL-15)_S2-181636-WA SENDORSEDIN_S2-181210_23501_EPS Fallback for Voice, 3rd Generation Partnership Project (3GPP), Mobile Competence Centre; 650, Route Des Lucioles, vol. SA WG2, No. Montreal, Canada; Feb. 26, 2018-Mar. 2, 2018; Mar. 19, 2018 (Mar. 19, 2018), XP051411260, Retrieved from the Internet: URL: https://www.3gpp.org/ftp/tsg_sa/WG2_Arch/TSGS2_126_Montreal/Docs/s2-181636.zip.

* cited by examiner

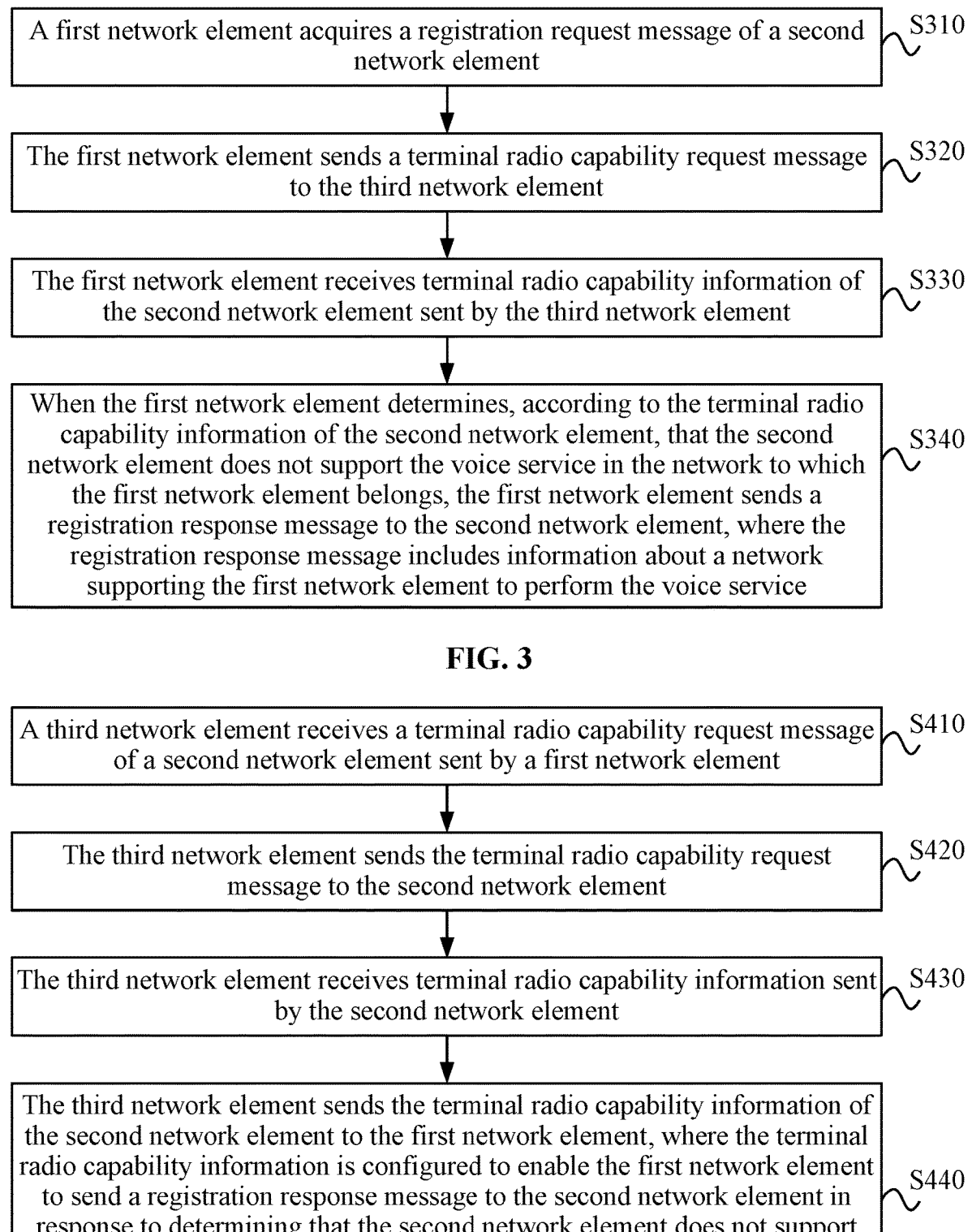

A first network element acquires a registration request message of a second network element ∽S310

The first network element sends a terminal radio capability request message to the third network element ∽S320

The first network element receives terminal radio capability information of the second network element sent by the third network element ∽S330

When the first network element determines, according to the terminal radio capability information of the second network element, that the second network element does not support the voice service in the network to which the first network element belongs, the first network element sends a registration response message to the second network element, where the registration response message includes information about a network supporting the first network element to perform the voice service ∽S340

FIG. 3

A third network element receives a terminal radio capability request message of a second network element sent by a first network element ∽S410

The third network element sends the terminal radio capability request message to the second network element ∽S420

The third network element receives terminal radio capability information sent by the second network element ∽S430

The third network element sends the terminal radio capability information of the second network element to the first network element, where the terminal radio capability information is configured to enable the first network element to send a registration response message to the second network element in response to determining that the second network element does not support the voice service in the network to which the first network element belongs, and the registration response message includes information about a network supporting the second network element to perform the voice service ∽S440

FIG. 4

TERMINAL ACCESS METHOD IN SHARED NETWORK, DEVICE, BASE STATION, AND STORAGE MEDIUM

CROSS REFERENCE TO RELATED APPLICATIONS

This is a National Stage Application, filed under 35 U.S.C. 371, of International Patent Application No. PCT/CN2022/123770, filed on Oct. 8, 2022, which claims priority to Chinese Patent Application No. 202210009208.4, filed with the China National Intellectual Property Administration (CNIPA) on Jan. 6, 2022, the disclosures of which are incorporated herein by reference in their entireties.

The present application claims priority to Chinese Patent Application No. 202210009208.4, filed with the China National Intellectual Property Administration (CNIPA) on Jan. 6, 2022, the disclosure of which is incorporated herein by reference in its entirety.

TECHNICAL FIELD

The present application relates to mobile communication technologies, for example, to a terminal access method in a shared network, a device, a base station, and a storage medium.

BACKGROUND

A 5th generation (5G) mobile communication framework specified by the 3rd generation partnership project (3GPP) protocol is shown in FIG. 1, and FIG. 1 is a schematic diagram of a 5G network framework. A 5G core network (5GC) includes an authentication management function (AMF) and a user plane function (UPF). A 5G access network (next generation radio access network, NG-RAN) element is a next generation eNodeB (ng-eNB) or a next generation Node B (gNB). An interface between the 5G access network and the 5G core network is a next generation (NG) interface.

In a process of building the 5G network, different operators may attack and share the 5G network infrastructure, but at the same time, different operators also each own complete and independent 4G network. Since no N26 interface exists between the AMF of the core network in a shared network and a mobility management entity (MME) of the 4G core network in an independent network, cross-system switching will not be supported.

The current 5G network supports a voice over new radio (VoNR) service, but a non-5G terminal does not support the VoNR capability, and in networks of the same operator, a terminal that does not support the VoNR may return to the 4G network to complete the call. However, in a case where the 5G network is built and shared by multiple operators, no N26 interface exists between the shared 5G core network and the respective independent 4G networks of the operators, so that when the terminal that does not support the VoNR capability accesses the shared 5G network, the 5G core network may trigger the VoNR service for the terminal. However, since the terminal cannot support the VoNR function, the base station cannot support the configuration of the VoNR, and no N26 interface exists between the shared 5G core network and the independent 4G network of the operator to which the terminal is subscribed so that the base station cannot support cross-system switching. At this time, the voice service of the terminal cannot be executed.

SUMMARY

The present application provides a terminal access method in a shared network, a device, a base station, and a storage medium to avoid voice service interruption caused by system switching in the shared network.

An embodiment of the present application provides a terminal access method in a shared network. The method includes the following: A first network element acquires a registration request message of a second network element; the first network element sends a terminal radio capability request message to a third network element; the first network element receives terminal radio capability information of the second network element sent by the third network element; and when it is determined, according to the terminal radio capability information of the second network element, that the second network element does not support a voice service in a network to which the first network element belongs, the first network element sends a registration response message to the second network element. The registration response message includes information about a network supporting the second network element to perform the voice service. The first network element is a core network element, the second network element is a terminal device, the third network element is a base station accessed by the second network element, and an operator to which the first network element belongs is different from an operator registered by the second network element.

An embodiment of the present application provides a terminal access method in a shared network. The method includes the following: A third network element receives a terminal radio capability request message of a second network element sent by a first network element; the third network element sends the terminal radio capability request message to the second network element; the third network element receives terminal radio capability information sent by the second network element; and the third network element sends the terminal radio capability information of the second network element to the first network element. The terminal radio capability information is configured to enable the first network element to send a registration response message to the second network element when the first network element determines that the second network element does not support a voice service in a network to which the first network element belongs, and the registration response message includes information about a network supporting the second network element to perform the voice service. The first network element is a core network element, the second network element is a terminal device, the third network element is a base station accessed by the second network element, and an operator to which the first network element belongs is different from an operator registered by the second network element.

An embodiment of the present application provides a core network device. The core network device includes one or more processors, and a storage apparatus. The storage apparatus is configured to store one or more programs. The one or more programs, when executed by the one or more processors, cause the one or more processors to implement the terminal access method in the shared network of any one of possible implementations executed by the first network element.

An embodiment of the present application provides a base station. The base station includes one or more processors, and a storage apparatus. The storage apparatus is configured to store one or more programs. The one or more programs, when executed by the one or more processors, cause the one or more processors to implement the terminal access method in the shared network of any one of possible implementations executed by the third network element.

An embodiment of the present application provides a computer-readable storage medium. The computer-readable storage medium stores a computer-executable instruction, and the computer-executable instruction is configured to perform the terminal access method in the shared network of any one of the preceding implementations.

BRIEF DESCRIPTION OF DRAWINGS

FIG. 3 is a flowchart of a terminal access method in a shared network according to an embodiment of the present application;

FIG. 4 is a flowchart of another terminal access method in a shared network according to an embodiment of the present application;

DETAILED DESCRIPTION

Figure 1:
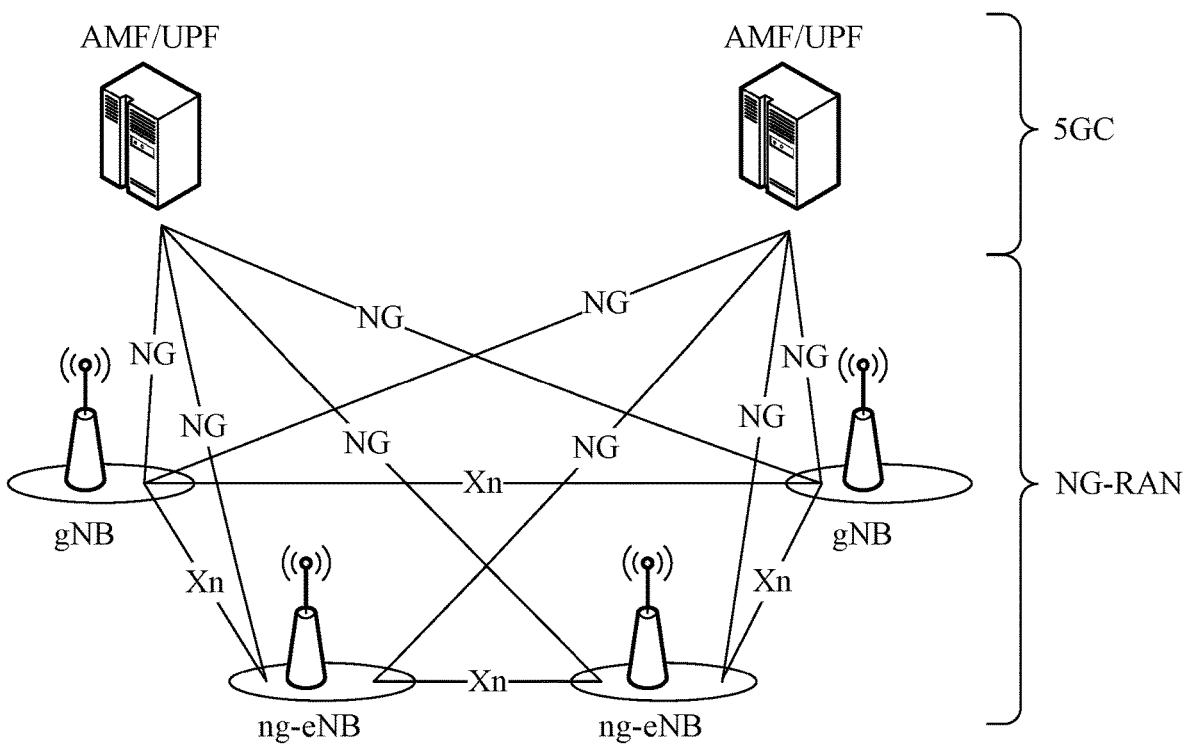
FIG. 1 is a schematic diagram of a 5G network framework.

Hereinafter, embodiments of the present application will be described in detail in conjunction with the accompanying drawings. It should be understood that specific embodiments described herein are merely illustrative of the present application and are not intended to limit the present application. It should be noted that the embodiments of the present application and features of the embodiments of the present application may be combined in any combination with each other without conflict. In addition, it should also be noted that, for ease of description, only some, but not all, of the structures related to the present application are shown in the drawings.

In the embodiments of the present application, words such as "optionally" or "exemplarily" are used for illustration, explanation, or description. Any embodiment or design scheme described as "optionally" or "exemplarily" in the embodiments of the present application should not be construed as preferred or advantageous over other embodiments or design schemes. Rather, use of words such as "optionally" or "exemplarily" is intended to present relevant concepts in a concrete manner.

Figure 2:
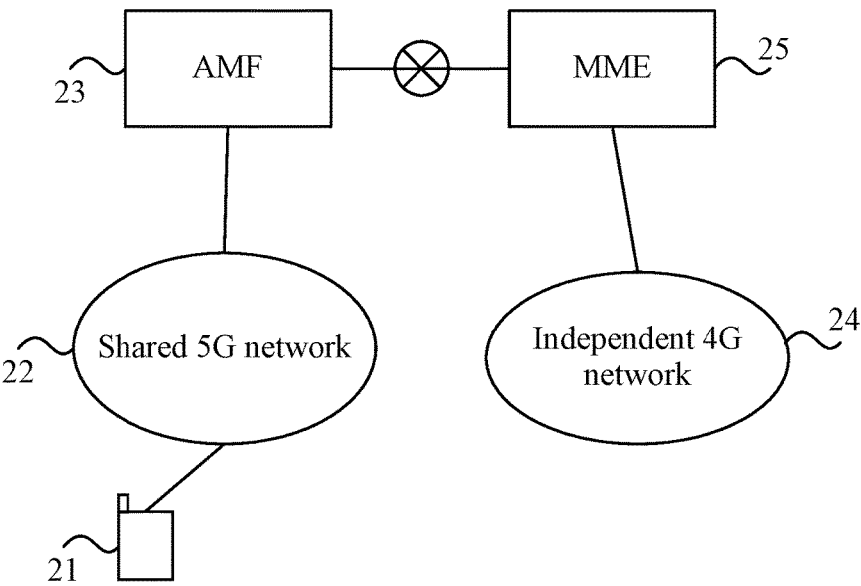
FIG. 2 is a schematic diagram of a shared network.

The 5G network is an evolved network. In addition to a newly-built 5G network, an original 4G network and other networks are stored in the network and jointly provide a mobile communication service for a terminal. To improve the network utilization and avoid the repeated construction, the current 5G network has the situation of being co-building and sharing the 5G network. Terminals subscribing to different operators may share the same 5G network, but only the 5G network is shared by different operators, while the original 4G network is independent, in a case where a terminal subscribed to one of the operators does not support the voice service (VoNR service) in the 5G network, since the shared 5G core network cannot learn that this terminal does not support the VoNR service, the shared 5G core network will trigger the VoNR service for this terminal. However, since the terminal cannot support the VoNR service, when a service request is sent to a base station of the 5G core network, the base station cannot support the configuration of the VoNR. However, since no N26 interface exists between the AMF of the shared 5G core network and the MME of the 4G core network of the independent network, the base station cannot support the cross-system switching. Therefore, the voice service of the terminal cannot be executed, and only the network is reselected, but since the 5G network still belongs to a candidate network of the terminal, which causes that the terminal repeatedly selects the 5G network and the voice service cannot be executed all the time. FIG. 2 is a schematic diagram of a shared network. As shown in FIG. 2, a terminal 21, which is registered in a second operator and does not support the VoNR service, accesses a shared 5G network 22 of the first operator and the second operator, no N26 interface exists between the AMF 23 of the shared 5G network 22 and the MME 25 of the independent 4G network 24 of the second operator, so that the user equipment (UE) 21 can neither perform the VoNR service in the shared 5G network 22 and nor return to the independent 4G network 24, thus, the voice service of the UE 21 cannot be used normally.

FIG. 3 is a flowchart of a terminal access method in a shared network according to an embodiment of the present application. As shown in FIG. 3, the terminal access method in the shared network according to this embodiment includes the following.

In S310, a first network element acquires a registration request message of a second network element.

The terminal access method in the shared network provided in this embodiment is used to enable a terminal in the shared network to normally perform a voice service, where the first network element is a core network element, the second network element is a terminal device, and a third network element is a base station accessed by the second network element. The second network element accesses a network to which the first network element belongs through the third network element. The network to which the first network element belongs is a shared network, which is shared by at least two operators, and terminals registered with the at least two operators sharing the network can access the network to which the first network element belongs. When the second network element accesses the network to which the first network element belongs, the second network element needs to send the registration request message to the first network element. The second network element may send the registration request message to the first network element through the third network element accessed by the second network element, or may send the registration request message to the first network element in other manners.

It should be noted that in the terminal access method in the shared network provided in this embodiment, the network to which the first network element belongs may be any network having the voice service support capability, such as a 5G network, then the first network element is a 5G core network element, and in this case, the second network element is a terminal device that does not support the voice over new radio (VoNR) service. The following embodiments of the present application are described by using the 5G network and the VoNR service as an example. However, the terminal access method in the shared network provided in the embodiments of the present application is not limited to the network and the voice service described above, and the terminal access method in the shared network provided in the embodiments of the present application may be applied as long as the scenario in which the voice service may not be supported exists in the shared network.

In S320, the first network element sends a terminal radio capability request message to the third network element.

To avoid the influence on normal use of the second network element since the second network element does not support the voice service in the network after the second network element is registered in the network to which the first network element belongs, the first network element may firstly confirm whether the second network element has the capability of performing the voice service in the network to which the first network element belongs after receiving the registration request message sent by the second network element. The first network element may send the terminal radio capability request message to the third network element, and the terminal radio capability request message is used for requesting the third network element to send a terminal radio capability of the second network element. Since the third network element is the base station accessed by the second network element, the third network element may acquire various configuration information of the second network element from the second network element, that is, the terminal radio capability information. The terminal radio capability information includes at least information about whether the second network element supports the voice service in the network to which the first network element belongs. Of course, the terminal radio capability information may further include at least one other information related to the terminal radio capability.

In S330, the first network element receives terminal radio capability information of the second network element sent by the third network element.

After the third network element acquires the terminal radio capability information of the second network element, the third network element sends the terminal radio capability information of the second network element to the first network element. The third network element may directly send the terminal radio capability information acquired from the second network element to the first network element. Alternatively, after parsing the terminal radio capability information sent by the second network element, the third network element may acquire information about whether the second network element supports the voice service in the network to which the first network element belongs, and then send the information to the first network element.

The core idea of the terminal access method in the shared network provided in this embodiment is to enable the first network element as the core network element to learn information about whether the second network element as the terminal supports the voice service in the network to which the first network element belongs, so that the first network element can correctly send the registration response message to the second network element. The first network element may have the capability of parsing the terminal radio capability information, that is, the first network element may acquire the unparsed terminal radio capability information from the third network element, and then parse the voice service support capability of the second network element from the unparsed terminal radio capability information. Alternatively, the first network element may directly receive the voice service support capability of the second network element from the third network element, that is, the third network element as the base station parses the terminal radio capability information, and sends the parsed result to the first network element.

If the terminal radio capability information is parsed by the third network element, the first network element receives the terminal radio capability information of the second network element sent by the third network element, and the terminal radio capability information contains the voice service support capability of the second network element. The third network element may acquire the terminal radio capability information of the second network element by sending a terminal radio capability request message to the second network element. In an embodiment, to enable the third network element to acquire and parse the terminal radio capability information of the second network element, the terminal radio capability request message sent by the first network element to the third network element may further include the voice service support capability of the second network element. That is, the first network element may explicitly instruct the third network element to acquire the voice service support capability of the second network element through an instruction, and the third network element parses the terminal radio capability information of the second network element and sends the terminal radio capability information of the second network element to the first network element according to the instruction of the first network element.

If the terminal radio capability information is parsed by the first network element, after the first network element receives the terminal radio capability information of the second network element sent by the third network element, the first network element parses the terminal radio capability information of the second network element to obtain the voice service support capability of the second network element.

In the two methods described above, if the third network element parses the terminal radio capability information, it is not necessary to upgrade the capability of the core network for parsing the radio capability information.

The terminal radio capability information may be a parameter newly added to the terminal radio capability information, and is specifically used to indicate the terminal radio capability information of the second network element.

In S340, when it is determined, according to the terminal radio capability information of the second network element, that the second network element does not support a voice service in the network to which the first network element belongs, the first network element sends a registration response message to the second network element, where the registration response message includes information about a network supporting the first network element to perform the voice service.

After the first network element receives the terminal radio capability information of the second network element sent by the third network element, the first network element may learn whether the second network element supports the voice service in the network to which the first network element belongs. If the second network element supports the voice service in the network to which the first network element belongs, the first network element may directly send a registration request response message to the second network element, the second network element is allowed to register in the network to which the first network element belongs, and the second network element may be normally used in the network to which the first network element belongs. However, if the second network element does not support the voice service in the network to which the first network element belongs, the first network element needs to send a registration request response message to the second network element, and the registration request response message includes information about a network supporting the second network element to perform the voice service. In other words, if the second network element does not support the voice service in the network to which the first network element belongs, the first network element selects an appropriate network for the second network element to access, so that the voice service of the second network element may be normally performed. Thus, if the second network element does not support the voice service in the network to which the first network element belongs, the first network element can select other appropriate networks for the second network element, so that the normal use of the second network element is ensured.

According to the terminal access method in the shared network provided in this embodiment, the first network element in the shared network firstly acquires the registration request message of the second network element, and then sends the terminal radio capability request message to the third network element. After the terminal radio capability information of the second network element sent by the third network element is received, if it is determined that the second network element does not support the voice service in the network to which the first network element belongs according to the terminal radio capability information of the second network element, the registration response message including the information about the network supporting the second network element to perform the voice service is sent to the second network element, so that a terminal that does not support the voice service in the shared network can still access other networks to perform the voice service, thereby improving the user experience.

FIG. 4 is a flowchart of another terminal access method in a shared network according to an embodiment of the present application. As shown in FIG. 4, the terminal access method in the shared network provided in this embodiment includes the following.

In S410, a third network element receives a terminal radio capability request message of a second network element sent by a first network element.

The terminal access method in the shared network provided in this embodiment is used to enable a terminal in the shared network to normally perform a voice service, where the first network element is a core network element, the second network element is a terminal device, and the third network element is a base station accessed by the second network element. The second network element accesses the network to which the first network element belongs through the third network element. The network to which the first network element belongs is a shared network and is shared by at least two operators, and all terminals registered with the at least two operators sharing the network can access the network to which the first network element belongs. When accessing the network to which the first network element belongs, the second network element needs to send a registration request message to the first network element. The second network element may send the registration request message to the first network element through the accessed third network element, or the second network element may send the registration request message to the first network element in other manners.

To avoid the influence on normal use of the second network element since the second network element does not support the voice service in the network after the second network element is registered in the network to which the first network element belongs, the first network element may firstly confirm whether the second network element has the capability of performing the voice service in the network to which the first network element belongs, after receiving the registration request message sent by the second network element. The first network element may send the terminal radio capability request message to the third network element, and the terminal radio capability request message is used to request the third network element to send a terminal radio capability of the first network element. It should be noted that in the terminal access method in the shared network provided in this embodiment, the network to which the first network element belongs may be any network having the voice service support capability, such as a 5G network, then the first network element is a 5G core network element, and in this case, the second network element is a terminal device that does not support the VoNR service. The following embodiments are described by using the 5G network and the VoNR service as an example. However, the terminal access method in the shared network provided in the embodiments of the present application is not limited to the network and the voice service described above, and the terminal access method in the shared network provided in the embodiments of the present application may be applied as long as the scenario in which the voice service may not be supported exists in the shared network.

In S420, the third network element sends the terminal radio capability request message to the second network element.

In S430, the third network element receives terminal radio capability information sent by the second network element.

Since the third network element is the base station accessed by the second network element, the third network element may acquire various configuration information of the second network element from the second network element, that is, the terminal radio capability information. The terminal radio capability information includes at least information on whether the second network element supports the voice service in the network to which the first network element belongs. Of course, the terminal radio capability information may further include at least one piece of other information related to the terminal radio capability. The third network element acquires the terminal radio capability information sent by the second network element in a manner of sending the terminal radio capability request message to the second network element.

In S440, the third network element sends the terminal radio capability information of the second network element to the first network element, the terminal radio capability information is used to enable the first network element to send a registration response message to the second network element in response to determining that the second network element does not support the voice service in the network to which the first network element belongs, and the registration response message includes information about a network supporting the second network element to perform the voice service.

After the third network element acquires the terminal radio capability information of the second network element, the third network element sends the terminal radio capability information of the second network element to the first network element. The third network element may directly send the terminal radio capability information acquired from the second network element to the first network element. Alternatively, after parsing the terminal radio capability information sent by the second network element, the third network element acquires information about whether the second network element supports the voice service in the network to which the first network element belongs and then sends the information to the first network element.

The core idea of the terminal access method in the shared network provided in this embodiment is to enable the first network element as the core network element to learn information about whether the second network element as the terminal supports the voice service in the network to which the first network element belongs, so that the first network element can correctly send the registration response message for the second network element. The first network element may have the capability of parsing the terminal radio capability information, that is, the first network element may acquire the unparsed terminal radio capability information from the third network element, and then parse the voice service support capability of the second network element from the unparsed terminal radio capability information. Alternatively, the first network element may directly receive the voice service support capability of the second network element from the third network element, that is, the third network element as the base station parses the terminal radio capability information and sends the parsed result to the first network element.

If the terminal radio capability information is parsed by the third network element, the first network element receives the terminal radio capability information of the second network element sent by the third network element, and the terminal radio capability information contains the voice service support capability of the second network element. The third network element may acquire the terminal radio capability information of the second network element by sending the terminal radio capability request message to the second network element. In an embodiment, to enable the third network element to acquire and parse the terminal radio capability information of the second network element, the terminal radio capability request message sent by the first network element to the third network element may further include the voice service support capability of the second network element. That is, the first network element may explicitly instruct the third network element to acquire the voice service support capability of the second network element through an instruction, and the third network element parses and sends the terminal radio capability information of the second network element to the first network element according to the instruction of the first network element.

If the terminal radio capability information is parsed by the first network element, after receiving the terminal radio capability information of the second network element sent by the third network element, the first network element parses the terminal radio capability information of the second network element to obtain the voice service support capability of the second network element.

The terminal radio capability information may be a parameter newly added to the terminal radio capability information, and is specifically used to indicate the terminal radio capability information of the second network element.

After the first network element receives the terminal radio capability information of the second network element sent by the third network element, the first network element may learn whether the second network element supports the voice service in the network to which the first network element belongs. If the second network element supports the voice service in the network to which the first network element belongs, the first network element may directly send a registration request response message to the second network element, the second network element is allowed to register in the network to which the first network element belongs, and the second network element may be normally used in the network to which the first network element belongs. However, if the second network element does not support voice service in the network to which the first network element belongs, the first network element needs to send a registration request response message to the second network element, and the registration request response message includes information about a network supporting the second network element to perform the voice service. That is, if the second network element does not support the voice service in the network to which the first network element belongs, the first network element selects an appropriate network for the second network element to access, so that the voice service of the second network element may be normally performed. Thus, when the second network element does not support the voice service in the network to which the first network element belongs, the first network element can select other appropriate networks for the second network element, so that the normal use of the second network element is ensured.

According to the terminal access method in the shared network provided in this embodiment, the third network element accessed by the second network element as the terminal securely receives the terminal radio capability request message of the second network element sent by the first network element in the shared network, then the third network element acquires the terminal radio capability information of the second network element and sends the terminal radio capability information of the second network element to the first network element, the terminal radio capability information is configured to enable the first network element to send the registration response message to the second network element in response to determining that the second network element does not support the voice service in the network to which the first network element belongs, where the registration response message includes information about a network supporting the second network element to perform the voice service, so that a terminal that does not support the voice service in the shared network can still access other networks to perform the voice service, thereby improving the user experience.

To make the terminal access method in the shared network provided in the embodiments of the present application clearer, the terminal access method in the shared network provided in the embodiments of the present application is further described below by using the following embodiments. In the embodiments shown in FIGS. 5 to 7, the core network element is used as the first network element, the terminal is used as the second network element, the base station is used as the third network element, the core network element is a shared 5G core network element, and the terminal does not support the VoNR service in the shared 5G core network.

Figure 5:
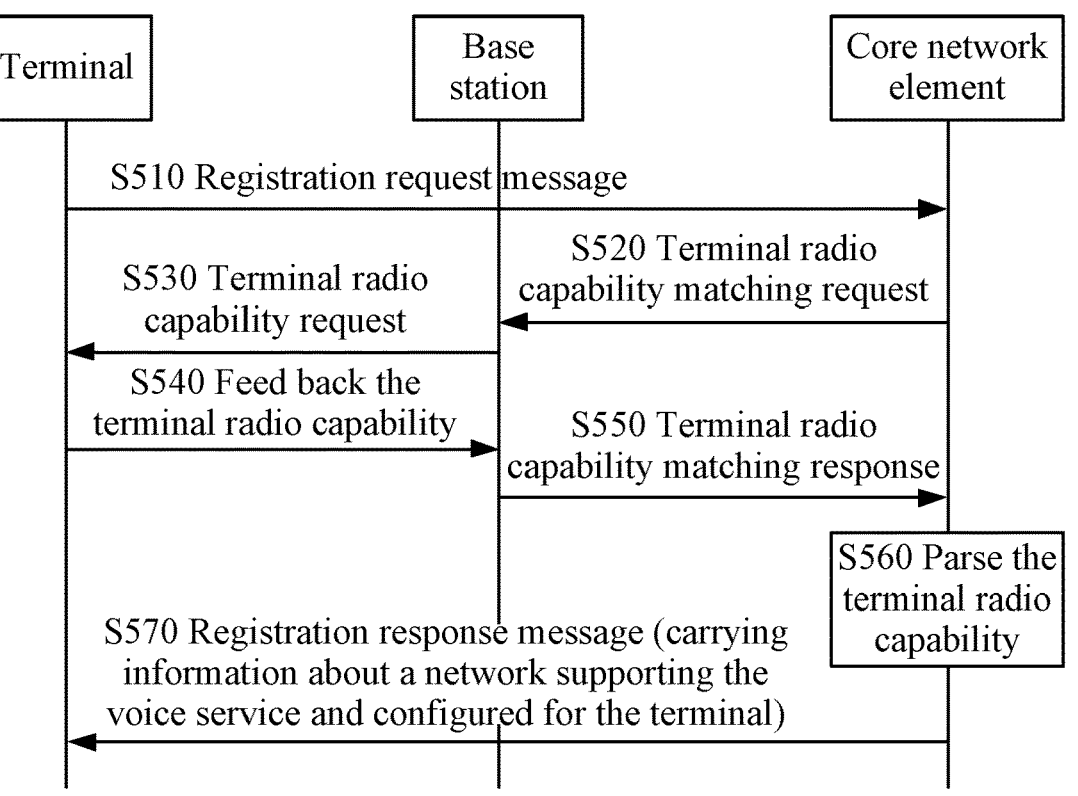
FIG. 5 is an interaction flowchart of a terminal access method in a shared network according to an embodiment of the present application.

FIG. 5 is an interaction flowchart of a terminal access method in a shared network according to an embodiment of the present application. As shown in FIG. 5, the terminal access method in the shared network provided in this embodiment includes the following.

In S510, the terminal sends a registration request message to the core network element.

When the terminal selects the network for the first time, a non-access stratum (NAS) message is sent, and the NAS message is the registration request message. The terminal radio capability does not support the VoNR function, and the core network element is an AMF of the 5G core network or an MME of a 4G core network.

In S520, the core network element sends a terminal radio capability matching request to the base station.

In S530, the base station sends a terminal radio capability request to the terminal.

Since the base station may not save the terminal radio capability, the radio capability information is acquired from the terminal through a radio resource control (RRC) message.

In S540, the terminal feeds back the terminal radio capability to the base station.

In S550, the base station sends a terminal radio capability matching response to the core network element.

In S560, the core network element parses the terminal radio capability.

The core network element determines that the terminal does not support the VoNR capability by parsing the terminal radio capability.

In S570, the core network element sends a registration response message to the terminal, and the registration response message carries information about a network supporting the voice service and configured for the terminal.

In the registration response message, the core network configures a network supporting the voice continuity for the terminal, and the terminal reselects an appropriate network In S620, the core network element sends a terminal radio capability matching request to the base station.

In S630, the base station sends a terminal radio capability request to the terminal.

Since the base station may not save the terminal radio capability, the radio capability information is acquired from the terminal through a radio resource control (RRC) message.

In S640, the terminal feeds back the terminal radio capability to the base station.

In S650, the base station sends a terminal radio capability matching response to the core network element.

After the base station acquires the terminal radio capability, the base station sends the radio capability to the core network element. Moreover, whether the terminal supports the VoNR capability is sent to the core network. For example, the flow in the 5G network is shown in the following, and reference is made to the NG interface protocol TS 38.413. In the message fed back by the 5G base station to the AMF of the core network, a UE radio capability check response message contains a cell (VoNR support indicator) indicating whether the terminal supports the VoNR. As shown in Table 1, Table 1 is a schematic table of the terminal radio capability. The item of information element (IE)/group name indicates various radio capability items of the terminal, the VoNR support indicator is the support capability of the terminal for the VoNR, and Presence indicates whether the corresponding item is configured, where M represents mandatory, and O represents optional. That is, the capability of the terminal supporting the VoNR service is used as a cell of the terminal radio capability, and is sent to the base station together.

TABLE 1

| IE/Group Name | Presence | Range | IE type and reference | Semantics description | Criticality | Assigned Criticality |
|---|---|---|---|---|---|---|
| Message Type | M | | 9.3.1.1 | | YES | reject |
| AMF UE NGAP ID | M | | 9.3.3.1 | | YES | ignore |
| RAN UE NGAP ID | M | | 9.3.3.2 | | YES | ignore |
| IMS Voice Support Indicator | M | | 9.3.1.89 | | YES | reject |
| Criticality Diagnostics | O | | 9.3.1.3 | | YES | ignore |
| VoNR Support Indicator | O | | ENUMERATED (Supported, Not Supported . . .) | | YES | ignore | for accessing after receiving the information. In this manner, after the voice service is triggered, the continuity of the voice service can be ensured.

Figure 6:
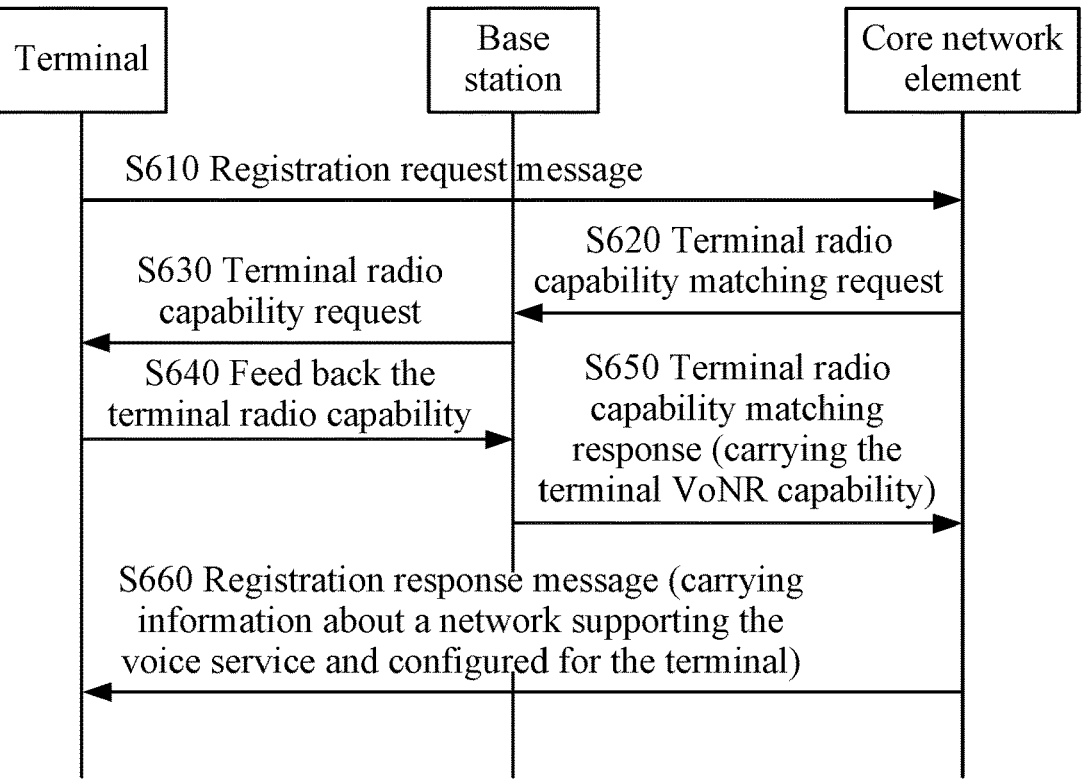
FIG. 6 is an interaction flowchart of another terminal access method in a shared network according to an embodiment of the present application.

FIG. 6 is an interaction flowchart of another terminal access method in a shared network according to an embodiment of the present application. As shown in FIG. 6, the terminal access method in the shared network provided in this embodiment includes the following.

In S610, the terminal sends a registration request message to the core network element.

When the terminal selects the network for the first time, a non-access stratum (NAS) message is sent, and the NAS message is the registration request message. The terminal radio capability does not support the VoNR function, and the core network element is an AMF of the 5G core network or an MME of a 4G core network.

The base station determines that the terminal does not support the VoNR capability by parsing the terminal radio capability.

In S660, the core network element sends a registration response message to the terminal, and the registration response message carries information about a network supporting the voice service and configured for the terminal.

After the terminal radio capability is obtained, the core network element saves the capability information and does not parse the capability information. Meanwhile, since the base station informs the core network that the terminal does not support the VoNR capability, the core network can determine that the terminal cannot support the VoNR service in the present network. In the registration response message, the core network configures a network supporting the voice continuity for the terminal, and the terminal reselects an appropriate network for accessing after receiving the information. In this manner, after the voice service is triggered, the continuity of the voice service can be ensured.

Figure 7:
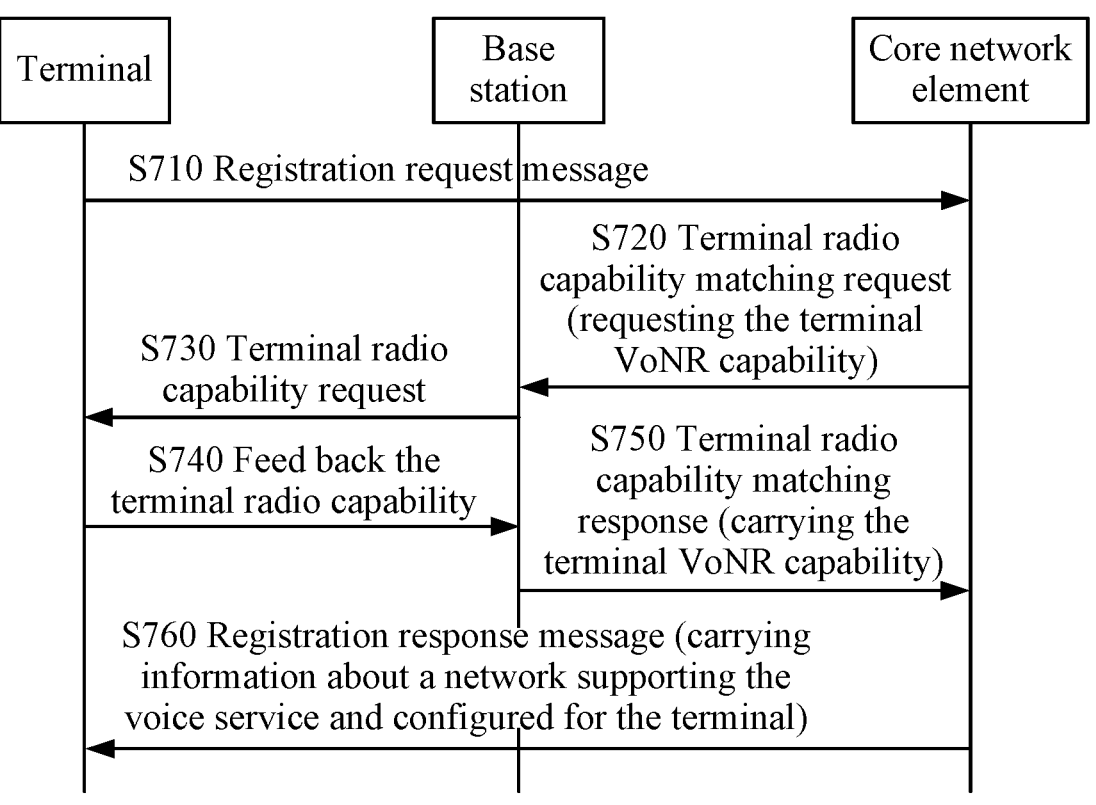
FIG. 7 is an interaction flowchart of another terminal access method in a shared network according to an embodiment of the present application.

FIG. 7 is an interaction flowchart of another terminal access method in a shared network according to an embodiment of the present application. As shown in FIG. 7, the terminal access method in the shared network provided in this embodiment includes the following.

In process S710, the terminal sends a registration request message to the core network element.

When the terminal selects the network for the first time, a non-access stratum (NAS) message is sent, and the NAS message is the registration request message. The terminal radio capability does not support the VoNR function, and the core network element is an AMF of the 5G core network or an MME of a 4G core network.

In S720, the core network element sends a terminal radio capability matching request containing a request for the terminal VoNR capability to the base station.

This embodiment differs from the embodiment shown in FIG. 6 in that the core network element clearly instructs the base station to provide an indication of whether the terminal supports the VoNR capability in the request message of this embodiment. For example, the flow in the 5G network is shown in the following, reference is made to the NG interface protocol TS 38.413. In the request message sent by the AMF of the core network to the 5G base station, a UE radio capability check request message contains a parameter indicating whether the core network node requires the base station to provide the terminal VoNR capability, that is, the VoNR capability require parameter. As shown in Table 2. Table 2 is another schematic table of the terminal radio capability.

The base station determines that the terminal does not support the VoNR capability by parsing the terminal radio capability.

In S760, the core network element sends a registration response message to the terminal, and the registration response message carries information about a network supporting the voice service and configured for the terminal.

After obtaining the terminal radio capability, the core network element saves the capability information and does not parse the capability information. Meanwhile, since the base station informs the core network that the terminal does not support the VoNR capability, the core network can determine that the terminal cannot support the VoNR service in the present network. In the registration response message, the core network configures a network supporting the voice continuity for the terminal, and the terminal reselects an appropriate network for accessing after receiving the information. In this manner, after the voice service is triggered, the continuity of the voice service can be ensured.

Figure 8:
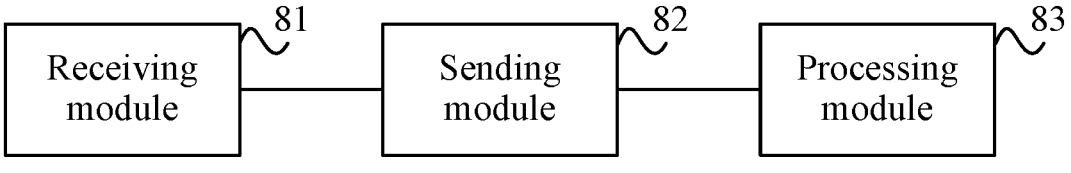
FIG. 8 is a schematic structural diagram of a terminal access apparatus in a shared network according to an embodiment of the present application.

FIG. 8 is a schematic structural diagram of a terminal access apparatus in a shared network according to an embodiment of the present application. The terminal access apparatus in the shared network provided in this embodiment is disposed in a first network element, and the apparatus includes a receiving module 81, a sending module 82 and a processing module 83. The receiving module 81 is configured to acquire a registration request message of a second network element. The sending module 82 is configured to send a terminal radio capability request message to a third network element. The receiving module 81 is further configured to receive terminal radio capability information of the second network element sent by the third network element. The processing module 83 is configured to determine whether the second network element supports a voice

| IE/Group Name | Presence | Range | IE type and reference | Semantics description | Criticality | Assigned Criticality |
|---|---|---|---|---|---|---|
| Message Type | M | | 9.3.1.1 | | YES | reject |
| AMF UE NGAP ID | M | | 9.3.3.1 | | YES | reject |
| RAN UE NGAP ID | M | | 9.3.3.2 | | YES | reject |
| UE Radio Capability | O | | 9.3.1.74 | | YES | ignore |
| UE Radio Capability ID | O | | 9.3.1.142 | | YES | reject |
| VoNR capability require | O | | ENUMERATED (true, . . .) | | YES | ignore |

In S730, the base station sends a terminal radio capability request to the terminal.

Since the base station may not save the terminal radio capability, the radio capability information is acquired from the terminal through a radio resource control (RRC) message.

In S740, the terminal feeds back the terminal radio capability to the base station.

In S750, the base station sends a terminal radio capability matching response to the core network element.

After the base station acquires the terminal radio capability, the base station sends the terminal radio capability to the core network element. Moreover, whether the terminal supports the VoNR capability is sent to the core network.

service in a network to which the first network element belongs according to the terminal radio capability information of the second network element. The sending module 82 is further configured to send a registration response message to the second network element in response to determining that the second internet element does not support the voice service in the network to which the first network element belongs. The registration response message includes information about a network supporting the second network element to perform the voice service. The first network element is a core network element, the second network element is a terminal device, the third network element is a base station accessed by the second network element, and the network to which the first network element belongs is a shared network shared by an operator registered by the second network element and other operators.

The terminal access apparatus in the mobile shared network provided in this embodiment is used to implement the terminal access method in the shared network provided in the embodiment shown in FIG. 3. The implementation principles and technical effects in the terminal access apparatus in the shared network are similar to the implementation principles and technical effects in the terminal access method in the shared network, and details are not repeated here.

Figure 9:
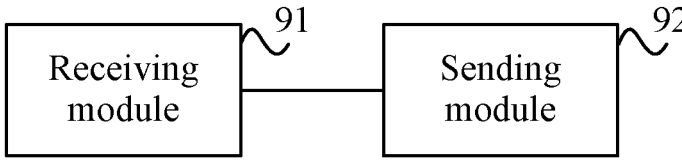
FIG. 9 is a schematic structural diagram of another terminal access apparatus in a shared network according to an embodiment of the present application.

FIG. 9 is a schematic structural diagram of another terminal access apparatus in a shared network according to an embodiment of the present application. The terminal access apparatus in the shared network provided in this embodiment is disposed in a third network element, and the apparatus includes a receiving module 91 and a sending module 92. The receiving module 91 is configured to receive a terminal radio capability request message of a second network element sent by a first network element. The sending module 92 is configured to send the terminal radio capability request message to the second network element. The receiving module 91 is further configured to receive terminal radio capability information sent by the second network element. The sending module 92 is further configured to send the terminal radio capability information of the second network element to the first network element. The terminal radio capability information is configured to enable the first network element to send a registration response message to the second network element in response to determining that the second network element does not support a voice service in a network to which the first network element belongs, and the registration response message includes information about a network supporting the second network element to perform the voice service. The first network element is a core network element, the second network element is a terminal device, the third network element is a base station accessed by the second network element, and the network to which the first network element belongs is a shared network shared by an operator registered by the second network element and other operators.

The terminal access apparatus in the mobile shared network provided in this embodiment is used to implement the terminal access method in the shared network provided in the embodiment shown in FIG. 4. The implementation principles and technical effects in the terminal access apparatus in the shared network are similar to the implementation principles and technical effects in the terminal access method in the shared network, and details are not repeated herein.

Figure 10:
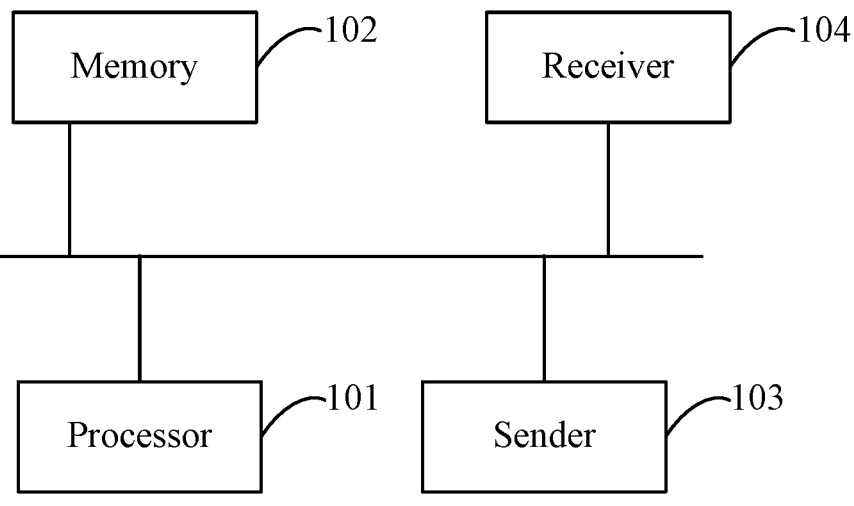
FIG. 10 is a schematic structural diagram of a core network device according to an embodiment.

FIG. 10 is a schematic structural diagram of a core network device according to an embodiment. As shown in FIG. 10, the core network device includes a processor 101, a memory 102, a sender 103 and a receiver 104. The number of processors 101 in the core network device may be one or more, for example, one processor 101 is used as an example in FIG. 10. The processor 101, the memory 102, the sender 103 and the receiver 104 in the core network device may be connected via a bus or otherwise, and the connection via a bus is used as an example in FIG. 10.

The memory 102, as a computer-readable storage medium, may be configured to store a software program, a computer-executable program and a module, such as a program instruction/module corresponding to the terminal access method in the shared network in the embodiment of FIG. 3 of the present application (such as, the receiving module 81, the sending module 82, and the processing module 83 in the terminal access apparatus in the shared network). The processor 101 implements at least one functional application and data processing of the core network device by running the software program, the instruction and the module stored in the memory 102, that is, implements the terminal access method in the shared network described above.

The memory 102 may mainly include a storage program region and a storage data region. The storage program region may store an operating system, and an application program required for at least one function. The storage data region may store data and the like created according to the use of the core network device. Moreover, the memory 102 may include a high speed random access memory and may also include a non-volatile memory such as at least one magnetic disk storage device, flash memory device, or other non-volatile solid state storage devices.

The sender 103 is any module or device combination capable of performing the data transmission, and the receiver 104 is any module or device combination capable of performing the data reception.

Figure 11:
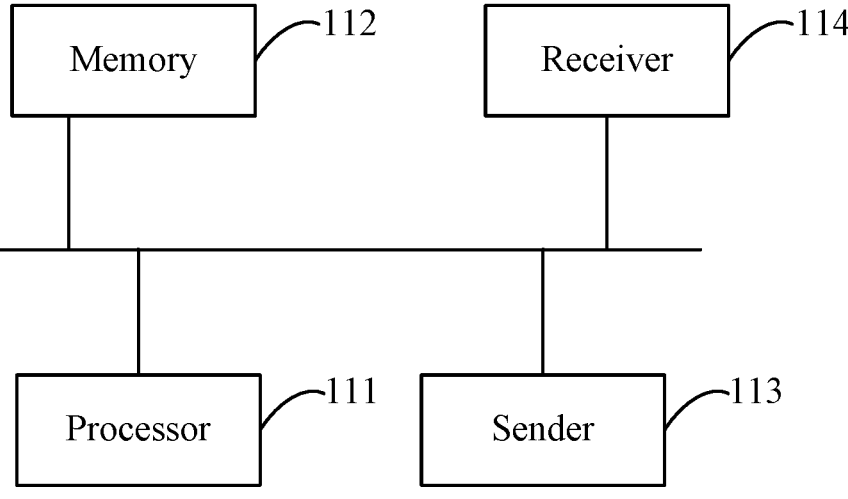
FIG. 11 is a schematic structural diagram of a base station according to an embodiment.

FIG. 11 is a schematic structural diagram of a base station according to an embodiment. As shown in FIG. 11, the base station includes a processor 111, a memory 112, a sender 113 and a receiver 114. The number of processors 111 in the base station may be one or more, for example, one processor 111 is used as an example in FIG. 11. The processor 111, the memory 112, the sender 113 and the receiver 114 in the base station may be connected via a bus or otherwise, and the connection via a bus is used as an example in FIG. 11.

The memory 112, as a computer-readable storage medium, may be configured to store a software program, a computer-executable program and a module, such as a program instruction/module corresponding to the terminal access method in the shared network in the embodiment of FIG. 4 of the present application (for example, the receiving module 91 and the sending module 92 in the terminal access apparatus in the shared network). The processor 111 implements at least one functional application and data processing of the base station by running the software program, the instruction and the module stored in the memory 112, that is, implements the terminal access method in the shared network described above.

The memory 112 may mainly include a storage program region and a storage data region. The storage program region may store an operating system, and an application program required for at least one function. The storage data region may store data and the like created according to the use of the base station. Moreover, the memory 112 may include a high speed random access memory and may also include a non-volatile memory such as at least one magnetic disk storage device, flash memory device, or other non-volatile solid state storage devices.

The sender 113 is any module or device combination capable of performing the data transmission, and the receiver 114 is any module or device combination capable of performing the data reception.

An embodiment of the present application further provides a storage medium including a computer-executable instruction. The computer-executable instruction, when executed by a computer processor, is configured to perform a terminal access method in a shared network. The method includes the following: A first network element acquires a registration request message of a second network element; the first network element sends a terminal radio capability request message to a third network element; the first network element receives terminal radio capability information of the second network element sent by the third network element;

and the first network element sends a registration response message to the second network element in response to determining, according to the terminal radio capability information of the second network element, that the second network element does not support a voice service in a network to which the first network element belongs, where the registration response message includes information about a network supporting the second network element to perform the voice service. The first network element is a core network element, the second network element is a terminal device, the third network element is a base station accessed by the second network element, and the network to which the first network element belongs is a shared network shared by an operator registered by the second network element and other operators.

An embodiment of the present application further provides a storage medium including a computer-executable instruction. The computer-executable instruction, when executed by a computer processor, is configured to perform a terminal access method in a shared network. The method includes the following: A third network element receives a terminal radio capability request message of a second network element sent by a first network element; the third network element sends the terminal radio capability request message to the second network element; the third network element receives terminal radio capability information sent by the second network element; and the third network element sends the terminal radio capability information of the second network element to the first network element, where the terminal radio capability information is configured to enable the first network element to send a registration response message to the second network element in response to determining that the second network element does not support a voice service in a network to which the first network element belongs, where the registration response message includes information about a network supporting the second network element to perform the voice service. The first network element is a core network element, the second network element is a terminal device, the third network element is a base station accessed by the second network element, and the network to which the first network element belongs is a shared network shared by an operator registered by the second network element and other operators.

In general, various embodiments of the present application may be implemented in hardware or special purpose circuits, software, logic or any combination thereof. For example, some aspects may be implemented in hardware, while other aspects may be implemented in firmware or software which may be executed by a controller, microprocessor or other computing apparatus, although the present application is not limited thereto.

The embodiments of the present application may be implemented by a data processor of a mobile apparatus executing computer program instructions, for example in a processor entity, or by hardware, or by a combination of software and hardware. The computer program instructions may be assembler instructions, instruction set architecture (ISA) instructions, machine instructions, machine-related instructions, microcode, firmware instructions, state setting data, or source or object codes written in any combination of one or more programming languages.

Any block diagram of the logic flow in the accompanying drawings of the present application may represent program processes, or may represent interconnected logic circuits, modules, and functions, or may represent a combination of program processes and logic circuits, modules, and functions. The computer program may be stored on a memory. The memory may be of any type suitable for the local technical environment and may be implemented using any suitable data storage technology, such as, but not limited to, a read-only memory (ROM), a random access memory (RAM), an optical memory device and system (digital versatile disc (DVD) or compact disk (CD)), and the like. Computer-readable media may include non-instantaneous storage media. The data processor may be of any type suitable for the local technical environment, such as, but not limited to, a general-purpose computer, a specialized computer, a microprocessor, a digital signal processor (DSP), an application specific integrated circuit (ASIC), a field-programmable gate array (FPGA)), and a processor based on a multi-core processor architecture.

What is claimed is:

1. A terminal access method in a shared network, comprising:

acquiring, by a first network element, a registration request message of a second network element;

sending, by the first network element, a terminal radio capability request message to a third network element;

receiving, by the first network element, terminal radio capability information of the second network element sent by the third network element; and in response to determining, according to the terminal radio capability information of the second network element, that the second network element does not support a voice service in a network to which the first network element belongs, sending, by the first network element, a registration response message to the second network element, wherein the registration response message comprises information about a network supporting the second network element to perform the voice service;

wherein the first network element is a core network element, the second network element is a terminal device, the third network element is a base station accessed by the second network element, and the network to which the first network element belongs is a shared network shared by an operator registered by the second network element and other operators.

2. The method of claim 1, wherein receiving, by the first network element, the terminal radio capability information of the second network element sent by the third network element comprises:

receiving, by the first network element, the terminal radio capability information of the second network element which is sent by the third network element and contains a voice service support capability of the second network element.

3. The method of claim 2, wherein sending, by the first network element, the terminal radio capability request message to the third network element comprises:

sending, by the first network element, the terminal radio capability request message containing a voice service support capability of the second network element to the third network element.

4. The method of claim 2, wherein acquiring, by the first network element, the registration request message of the second network element comprises:

acquiring, by the first network element, the registration request message of the second network element through the third network element.

5. The method of claim 2, wherein the first network element is a fifth generation (5G) mobile communication core network element, and the second network element is a terminal device that does not support a voice over new radio (VONR) service.

6. The method of claim 1, wherein sending, by the first network element, the terminal radio capability request message to the third network element comprises:

sending, by the first network element, the terminal radio capability request message containing a voice service support capability of the second network element to the third network element.

7. The method of claim 6, wherein acquiring, by the first network element, the registration request message of the second network element comprises:

acquiring, by the first network element, the registration request message of the second network element through the third network element.

8. The method of claim 6, wherein the first network element is a fifth generation (5G) mobile communication core network element, and the second network element is a terminal device that does not support a voice over new radio (VoNR) service.

9. The method of claim 1, wherein after receiving, by the first network element, the terminal radio capability information of the second network element sent by the third network element, the method further comprises:

parsing, by the first network element, the terminal radio capability information of the second network element to obtain a voice service support capability of the second network element.

10. The method of claim 1, wherein acquiring, by the first network element, the registration request message of the second network element comprises:

acquiring, by the first network element, the registration request message of the second network element through the third network element.

11. The method of claim 1, wherein the first network element is a fifth generation (5G) mobile communication core network element, and the second network element is a terminal device that does not support a voice over new radio (VoNR) service.

12. A non-transitory computer-readable storage medium, storing a computer-executable instruction, wherein the computer-executable instruction is configured to perform the terminal access method in the shared network of claim 1.

13. A terminal access method in a shared network, comprising:

receiving, by a third network element, a terminal radio capability request message of a second network element sent by a first network element;

sending, by the third network element, the terminal radio capability request message to the second network element;

receiving, by the third network element, terminal radio capability information sent by the second network element; and sending, by the third network element, the terminal radio capability information of the second network element to the first network element, wherein the terminal radio capability information is configured to enable the first network element to send a registration response message to the second network element, in response to determining that the second network element does not support a voice service in a network to which the first network element belongs, and the registration response message comprises information about a network supporting the second network element to perform the voice service;

wherein the first network element is a core network element, the second network element is a terminal device, the third network element is a base station accessed by the second network element, and the network to which the first network element belongs is a shared network shared by an operator registered by the second network element and other operators.

14. The method of claim 13, wherein after receiving, by the third network element, the terminal radio capability information sent by the second network element, the method further comprises:

parsing, by the third network element, the terminal radio capability information of the second network element to obtain a voice service support capability of the second network element;

wherein sending, by the third network element, the terminal radio capability information of the second network element to the first network element comprises:

sending, by the third network element, the terminal radio capability information of the second network element containing the voice service support capability of the second network element to the first network element.

15. The method of claim 14, wherein receiving, by the third network element, the terminal radio capability request message of the second network element sent by the first network element comprises:

receiving, by the third network element, the terminal radio capability request message of the second network element which is sent by the first network element and contains the voice service support capability of the second network element.

16. The method of claim 13, wherein before receiving, by the third network element, the terminal radio capability request message of the second network element sent by the first network element, the method further comprises:

sending, through the third network element, a registration request message from the second network element to the first network element.

17. The method of claim 13, wherein the first network element is a fifth generation (5G) core network element, and the second network element is a terminal device that does not support a voice over new radio (VoNR) service.

18. A base station, comprising:

at least one processor; and a storage apparatus configured to store at least one program;

wherein the at least one program, when executed by the at least one processor, causes the at least one processor to implement the terminal access method in the shared network of of claim 7.

19. A non-transitory computer-readable storage medium, storing a computer-executable instruction, wherein the computer-executable instruction is configured to perform the terminal access method in the shared network of claim 13.

20. A core network device, comprising:

at least one processor; and a storage apparatus configured to store at least one program;

wherein the at least one program, when executed by the at least one processor, causes the at least one processor to implement the following:

acquiring, by a first network element, a registration request message of a second network element;

sending, by the first network element, a terminal radio capability request message to a third network element;

receiving, by the first network element, terminal radio capability information of the second network element sent by the third network element; and in response to determining, according to the terminal radio capability information of the second network element, that the second network element does not support a voice service in a network to which the first network element belongs, sending, by the first network element a registration response message to the second network element, wherein the registration response message comprises information about a network supporting the second network element to perform the voice service;

wherein the first network element is a core network element, the second network element is a terminal device, the third network element is a base station accessed by the second network element, and the network to which the first network element belongs is a shared network shared by an operator registered by the second network element and other operators.

* * * * *